(12) United States Patent
Kim et al.

(10) Patent No.: US 12,198,858 B2
(45) Date of Patent: Jan. 14, 2025

(54) MULTILAYER ELECTRONIC COMPONENT

(71) Applicant: SAMSUNG ELECTRO-MECHANICS CO., LTD., Suwon-si (KR)

(72) Inventors: Og Soon Kim, Suwon-si (KR); Chae Dong Lee, Suwon-si (KR); Hye Won Kim, Suwon-si (KR); Jung Won Park, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 258 days.

(21) Appl. No.: 17/984,881

(22) Filed: Nov. 10, 2022

(65) Prior Publication Data
US 2023/0215630 A1 Jul. 6, 2023

(30) Foreign Application Priority Data

Dec. 31, 2021 (KR) .................. 10-2021-0194277
Aug. 17, 2022 (KR) .................. 10-2022-0102850

(51) Int. Cl.
*H01G 4/008* (2006.01)
*B32B 5/16* (2006.01)
(Continued)

(52) U.S. Cl.
CPC .............. *H01G 4/008* (2013.01); *B32B 5/16* (2013.01); *B32B 27/08* (2013.01); *B32B 27/302* (2013.01);
(Continued)

(58) Field of Classification Search
CPC . H01G 4/008; H01G 4/30; B32B 5/16; B32B 27/08; B32B 27/302; B32B 27/38;
(Continued)

(56) References Cited

U.S. PATENT DOCUMENTS 10,879,006 B2 * 12/2020 Kim .................. H01G 4/224
2006/0044098 A1 3/2006 Kimura et al.
(Continued)

FOREIGN PATENT DOCUMENTS

JP 2003197460 A * 7/2003
JP WO2004/053901 A1 6/2004
(Continued)

OTHER PUBLICATIONS

Extended European Search Report dated Mar. 15, 2023 issued in European Patent Application No. 22208823.9.

*Primary Examiner* — Michael P McFadden
(74) *Attorney, Agent, or Firm* — Morgan, Lewis & Bockius LLP

(57) ABSTRACT

A multilayer electronic component includes: a body and an external electrode disposed on the body, wherein the external electrode includes a conductive resin layer containing a bisphenol A-based resin and a biphenyl-based resin with a specific mixing ratio (e.g., a ratio of a content of the biphenyl-based resin with respect to a total content is 10 wt % or more and 50 wt % or less). Such a resin mixing ratio between the bisphenol A-based resin and the biphenyl-based resin can lead to $0.337 \leq 2*C/A \leq 0.367$ or $0.048 \leq B/A \leq 0.14$, with an aromatic ring peak intensity (A), a carbonyl peak intensity (B), and an alcohol peak intensity (C) in a Fourier transform infrared spectroscopy (FT-IR) analysis. The multilayer electronic component showing such peak intensity characteristics can suppress oxidation of a conductive resin layer while also securing excellent adhesive strength of the conductive resin layer.

28 Claims, 9 Drawing Sheets

(51) Int. Cl.
  *B32B 27/08*  (2006.01)
  *B32B 27/30*  (2006.01)
  *B32B 27/38*  (2006.01)
  *H01G 4/30*  (2006.01)

(52) U.S. Cl.
  CPC ............... *B32B 27/38* (2013.01); *H01G 4/30* (2013.01); *B32B 2264/105* (2013.01); *B32B 2307/202* (2013.01); *B32B 2307/204* (2013.01); *B32B 2457/16* (2013.01)

(58) Field of Classification Search
  CPC ........ B32B 2264/105; B32B 2307/202; B32B 2307/204; B32B 2457/16
  See application file for complete search history.

(56) References Cited

U.S. PATENT DOCUMENTS

| | | | | |
|---|---|---|---|---|
| 2014/0160627 A1* | 6/2014 | Kobayashi | ........... | H01G 4/2325 |
| | | | | 361/303 |
| 2020/0123285 A1* | 4/2020 | Henning | ................ | C08C 19/44 |
| 2020/0343046 A1 | 10/2020 | Hodgkinson et al. | | |
| 2021/0366656 A1* | 11/2021 | Furuhashi | ................ | H01G 4/18 |

FOREIGN PATENT DOCUMENTS

| | | | | |
|---|---|---|---|---|
| JP | 3917037 B2 | 5/2007 | | |
| JP | 2014-120382 A | 6/2014 | | |
| KR | 10-1426705 B1 | 8/2014 | | |
| WO | WO-2013151172 A1 * | 10/2013 | ............ | B22F 1/0018 |
| WO | 2014/103569 A1 | 7/2014 | | |

\* cited by examiner

MULTILAYER ELECTRONIC COMPONENT

CROSS-REFERENCE TO RELATED APPLICATION(S)

This application claims the benefit of priority to Korean Patent Application No. 10-2021-0194277 filed on Dec. 31, 2021 and Korean Patent Application No. 10-2022-0102850 filed on Aug. 17, 2022 in the Korean Intellectual Property Office, the disclosures of which are incorporated herein by reference in their entirety.

BACKGROUND

1. Field

The present disclosure relates to a multilayer electronic component.

2. Description of Related Art

A multilayer ceramic capacitor (MLCC), a multilayer electronic component, is a chip-type condenser mounted on the printed circuit boards of various types of electronic products, for example, display devices such as liquid crystal displays (LCD) and plasma display panels (PDP), computers, smartphones, mobile phones, and the like, and serves to charge or discharge electricity.

A multilayer ceramic capacity (MLCC) product group may be largely divided into IT products and electronic products.

The MLCC for electronic products acts as a condenser like the MLCC for IT, but since the MLCC for electronic products is prone to be exposed to an environment in which a stress is concentrated on a mounting part between an external electrode and a substrate, it requires excellent bending strength in order to relieve the stress.

In order to secure excellent bending strength, a plan to change an external electrode configured by a conventional electrode layer to a dual layer electrode layer and a conductive resin layer was suggested.

The dual layer electrode layer and a conductive resin layer may be formed by applying a resin composition containing a conductive material to an electrode layer, thereby absorbing external impacts and preventing penetration of a plating solution to improve reliability.

However, since the resin of the conductive resin layer is oxidized, an adhesive strength between a ceramic body and an electrode layer may be decreased, and since a gas by-product (such as hydrogen and carbon dioxide) produced in the process is located between an electrode layer and a conductive resin layer, lifting and bursting defects of an external electrode may occur.

SUMMARY

An aspect of the present disclosure may suppress lifting and bursting defects of an external electrode occurring when the external electrode includes a conductive resin layer.

Another aspect of the present disclosure may secure adhesive strength of a conductive resin layer.

Another aspect of the present disclosure may suppress oxidation of a conductive resin layer.

However, the aspects of the present disclosure are not limited to the descriptions above, and may be more easily understood in a process of describing specific exemplary embodiments in the present disclosure.

According to an aspect of the present disclosure, a multilayer electronic component may include: a body including a dielectric layer and an internal electrode, and an external electrode disposed on the body, wherein the external electrode includes a conductive resin layer including a conductive metal and a resin, and on a biaxial graph including a relationship curve illustrating a relationship of spectrum intensity to a wave number of the conductive resin layer obtained by FT-IR analysis, when a reference line La connecting spectrum intensity at a wave number of 1420 $cm^{-1}$ and spectrum intensity at a wave number of 1520 $cm^{-1}$ on the relationship curve is drawn and a maximum size in a direction parallel to a spectrum intensity axis from La to the relationship curve in a wave number area of 1420 $cm^{-1}$ to 1520 $cm^{-1}$ is A, and a reference line Lc connecting spectrum intensity at a wave number of 3100 $cm^{-1}$ and spectrum intensity at a wave number of 3700 $cm^{-1}$ on the relationship curve is drawn and a maximum size in the direction parallel to the spectrum intensity axis from Lc to the relationship curve in a wave number area of 3100 $cm^{-1}$ to 3700 $cm^{-1}$ is C, A and C satisfy: $0.337 \leq 2*C/A \leq 0.367$.

According to another aspect of the present disclosure, a multilayer electronic component may include: a body including a dielectric layer and an internal electrode, and an external electrode disposed on the body, wherein the electrode layer includes an electrode layer disposed on the body and including a conductive metal and a glass and a conductive resin layer disposed on the electrode layer, and the conductive resin layer includes a conductive metal, a bisphenol A-based resin, and a biphenyl-based resin.

According to still another aspect of the present disclosure, a multilayer electronic component may include: a body including a dielectric layer and an internal electrode, and an external electrode disposed on the body, wherein the external electrode includes a conductive resin layer including a conductive metal and a resin, and on a biaxial graph including a relationship curve illustrating a relationship of spectrum intensity to a wave number of the conductive resin layer obtained by FT-IR analysis, when a reference line La connecting spectrum intensity at a wave number of 1420 $cm^{-1}$ and spectrum intensity at a wave number of 1520 $cm^{-1}$ on the relationship curve is drawn and a maximum size in a direction parallel to the spectrum intensity axis from La to the relationship curve in a wave number area of 1420 $cm^{-1}$ to 1520 $cm^{-1}$ is A, and a reference line Lb connecting spectrum intensity at a wave number of 1650 $cm^{-1}$ and spectrum intensity at a wave number of 1800 $cm^{-1}$ on the relationship curve is drawn and a maximum size in the direction parallel to the spectrum intensity axis from Lb to the relationship curve in a wave number area of 1650 $cm^{-1}$ to 1800 $cm^{-1}$ is B, A and B satisfy: $0.048 \leq B/A \leq 0.14$.

BRIEF DESCRIPTION OF DRAWINGS

The above and other aspects, features and other advantages of the present disclosure will be more clearly understood from the following detailed description taken in conjunction with the accompanying drawings, in which.

DETAILED DESCRIPTION

Figure 1:
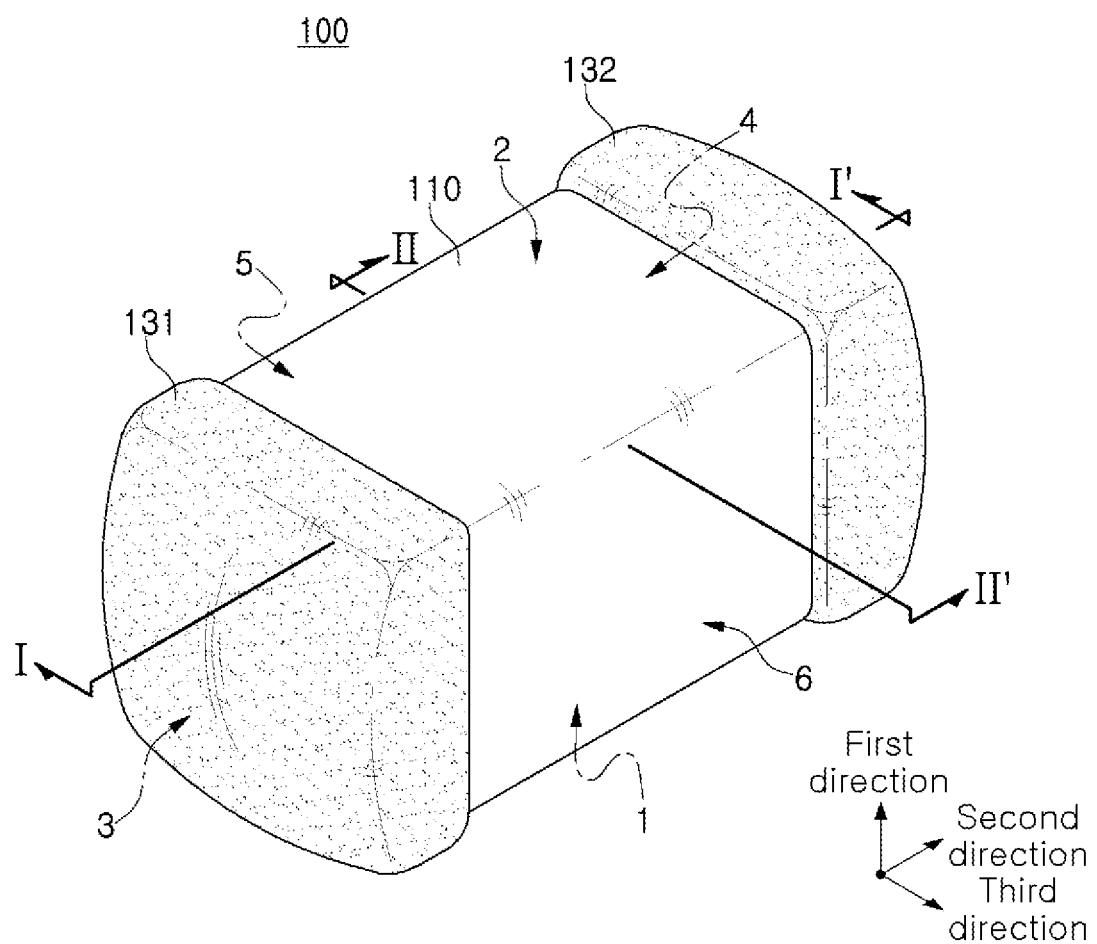
FIG. 1 is a perspective view illustrating a multilayer electronic component according to an exemplary embodiment in the present disclosure.

Hereinafter, exemplary embodiments in the present disclosure will now be described in detail with reference to the specific exemplary embodiments and the accompanying drawings. However, the embodiments in the present disclosure may be modified in many different forms and the scope of the disclosure should not be limited to the embodiments set forth herein. In addition, the embodiments in the present disclosure are provided so that the disclosure will be conveyed more completely to those skilled in the art. Therefore, the shapes, dimensions and the like of components in the drawings may be exaggerated for clarity, and the same reference numerals will be used throughout to designate the same or like components.

Further, in the drawings, parts not related to the description are omitted for clearly describing the present disclosure, and since the size and the thickness of each configuration shown in the drawings are arbitrarily shown for convenience of description, the present disclosure is not necessarily limited to the illustration. Further, like reference numerals will be used to designate like components having similar functions within the scope of the present invention. Furthermore, throughout the present specification, unless explicitly described to the contrary, "comprising" any elements will be understood to imply further inclusion of other elements rather than the exclusion of any other elements.

In the drawings, a first direction may be defined as a thickness (T) direction, a second direction may be defined as a length (L) direction, and a third direction may be defined as a width (W) direction.

FIG. 1 is a perspective view illustrating a multilayer electronic component according to an exemplary embodiment in the present disclosure.

Figure 2:
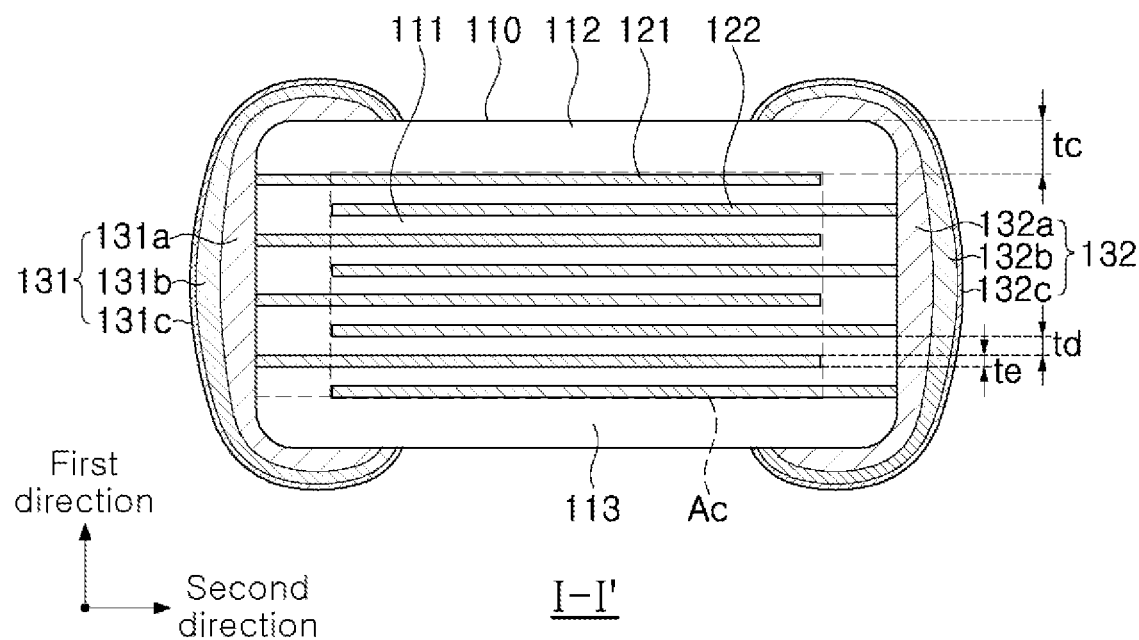
FIG. 2 is a cross-sectional view taken along line I-I' of FIG. 1.

FIG. 2 is a cross-sectional view taken along line I-I' of FIG. 1.

Figure 3:
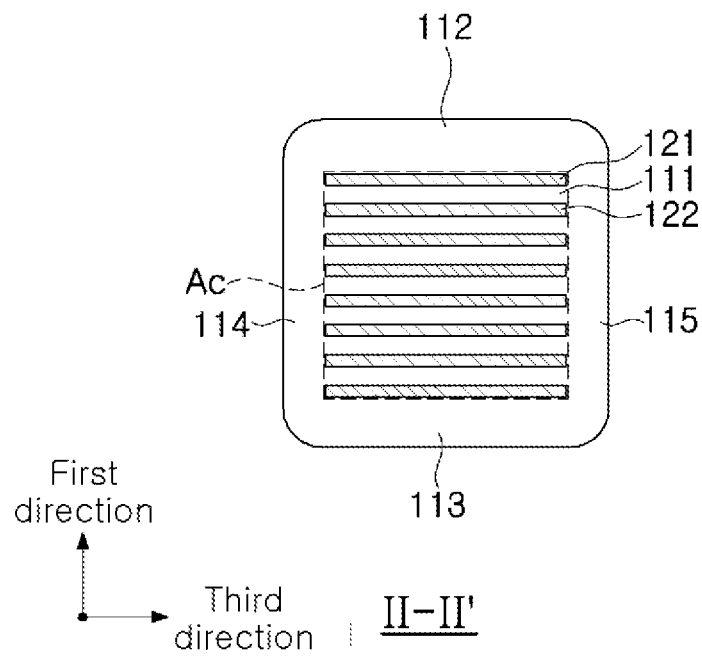
FIG. 3 is a cross-sectional view taken along line II-II' of FIG. 1.

FIG. 3 is a cross-sectional view taken along line II-II' of FIG. 1.

Figure 4:
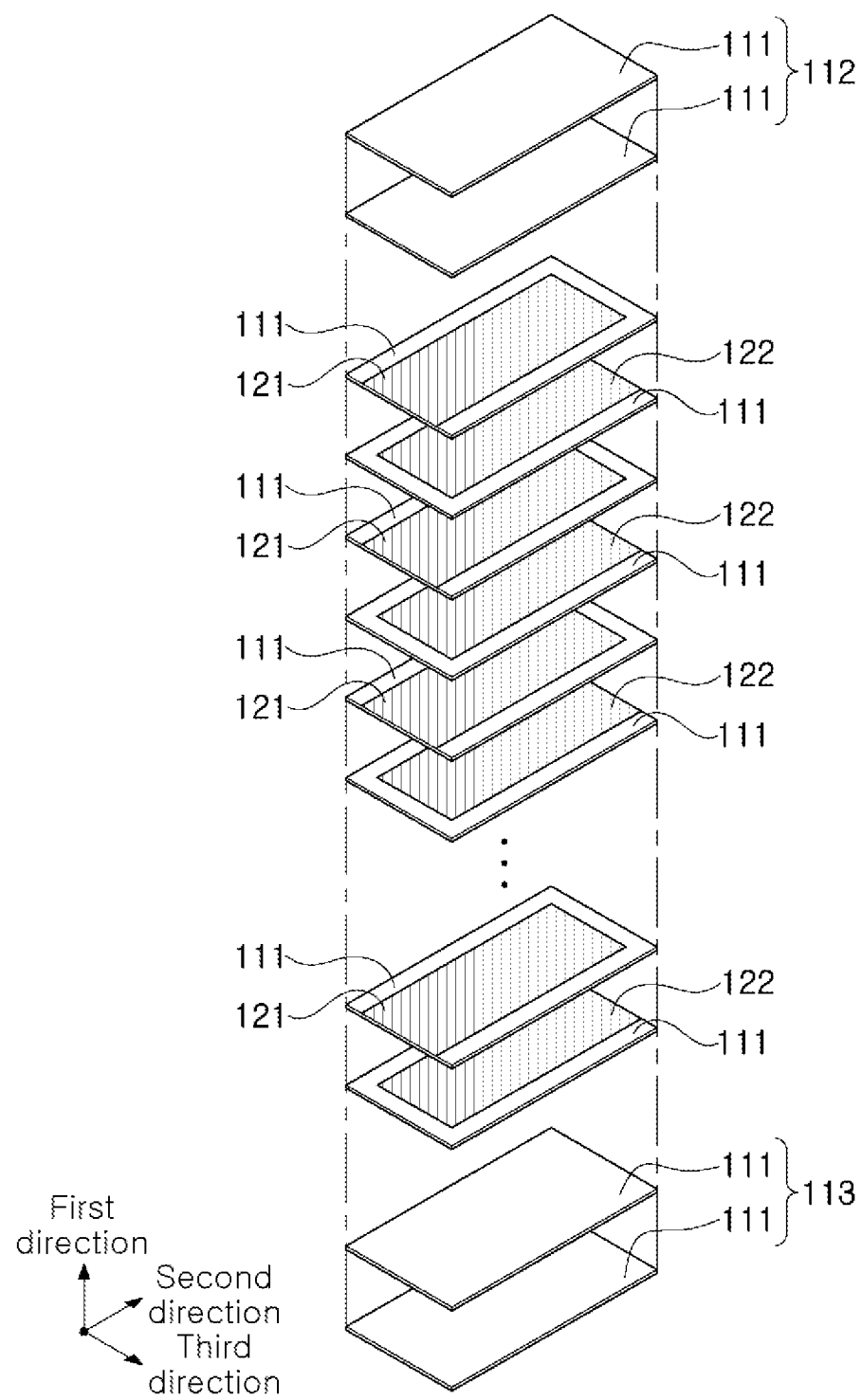
FIG. 4 is an exploded perspective view illustrating a body of the multilayer electronic component according to an exemplary embodiment in the present disclosure.

FIG. 4 is an exploded perspective view illustrating a body of the multilayer electronic component according to an exemplary embodiment in the present disclosure.

Figure 5:
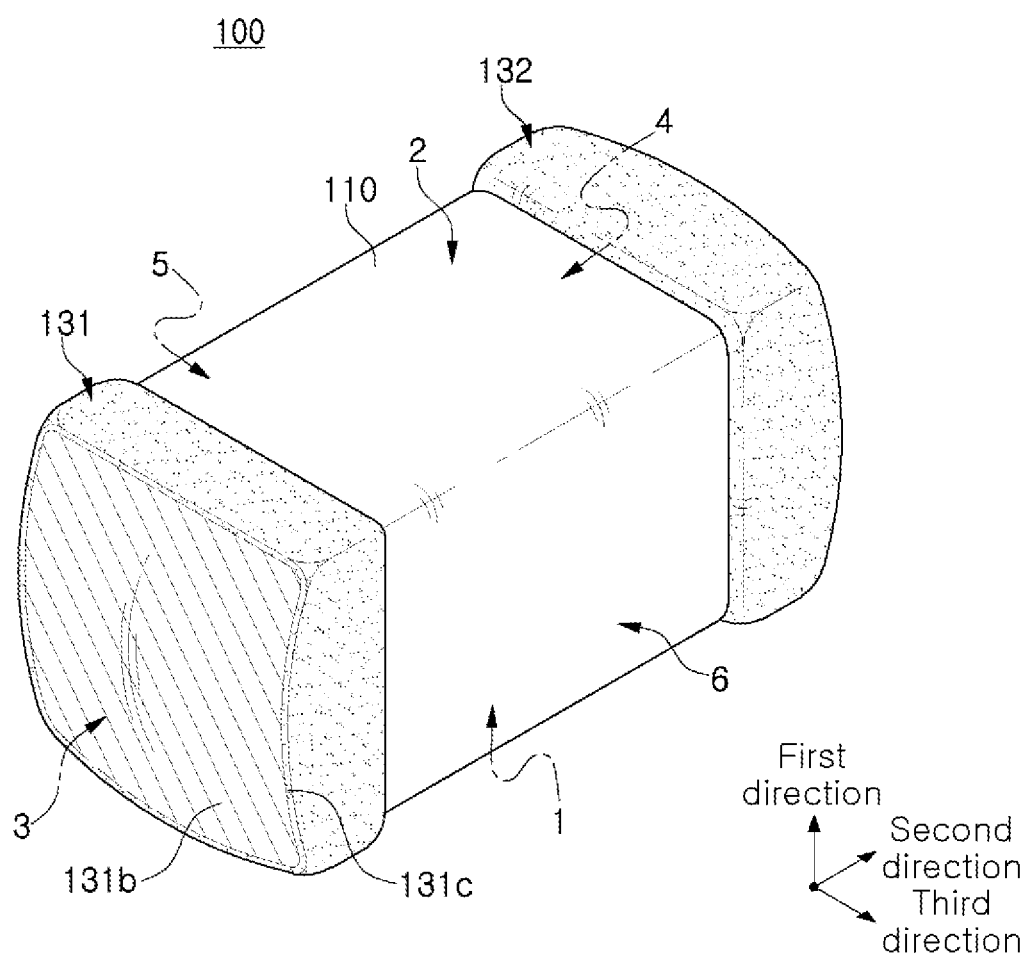
FIG. 5 is a perspective view of a multilayer electronic component in which a conductive resin layer disposed on a third surface of the body is exposed for FT-IR analysis.

FIG. 5 is a perspective view of a multilayer electronic component in which a conductive resin layer disposed on a third surface of the body is exposed for FT-IR analysis.

Figure 6:
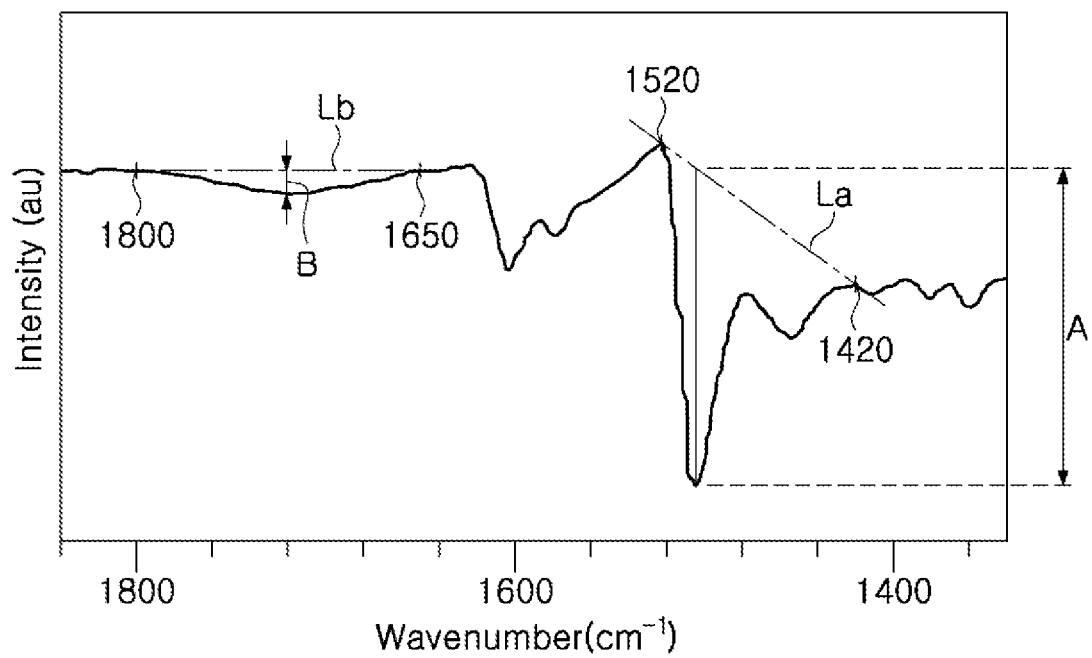
FIG. 6 is a graph for describing a method of measuring A and B from a relationship curve obtained by the FT-IR analysis.

FIG. 6 is a graph for describing a method of measuring A and B from a relationship curve obtained by the FT-IR analysis.

Figure 7:
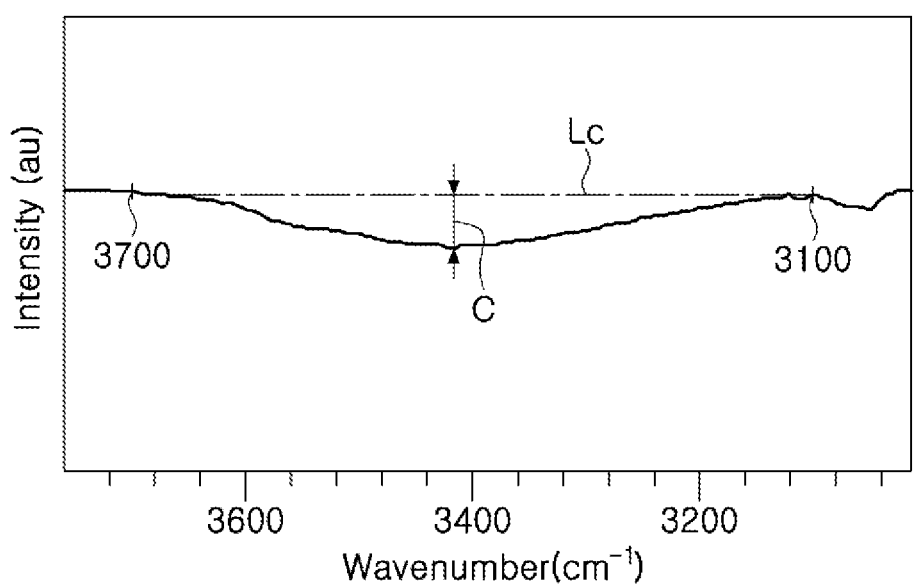
FIG. 7 is a graph for describing a method of measuring C from the relationship curve obtained by the FT-IR analysis.

FIG. 7 is a graph for describing a method of measuring C from the relationship curve obtained by the FT-IR analysis.

Hereinafter, referring to FIGS. 1 to 7, the multilayer electronic component 100 according to an exemplary embodiment in the present disclosure will be described.

The multilayer electronic component 100 according to an exemplary embodiment in the present disclosure includes: a body including a dielectric layer 111 and internal electrodes 121 and 122, and external electrodes 131 and 132 disposed on the body, wherein the external electrode includes conductive resin layers 131b and 132b including a conductive metal and a resin, and on a biaxial graph including a relationship curve illustrating a relationship of spectrum intensity to a wave number of the conductive resin layer obtained by FT-IR analysis, when a reference line La connecting spectrum intensity at a wave number of 1420 cm$^{-1}$ and spectrum intensity at a wave number of 1520 cm$^{-1}$ on the relationship curve is drawn and a maximum size in a direction parallel to the spectrum intensity axis from La to the relationship curve in a wave number area of 1420 cm$^{-1}$ to 1520 cm$^{-1}$ is A, and a reference line Lc connecting spectrum intensity at a wave number of 3100 cm$^{-1}$ and spectrum intensity at a wave number of 3700 cm$^{-1}$ on the relationship curve is drawn and a maximum size in a direction parallel to the spectrum intensity axis from Lc to the relationship curve in a wave number area of 3100 cm$^{-1}$ to 3700 cm$^{-1}$ is C, A and C satisfy: $0.337 \leq 2*C/A \leq 0.367$.

The external electrodes 131 and 132 may be disposed on a third surface 3 and a fourth surface 4 of the body 110.

The external electrodes 131 and 132 may be disposed on the third and fourth surfaces 3 and 4 of the body 110, respectively to include first and second external electrodes 131 and 132 which are connected to first and second internal electrodes 121 and 122, respectively.

In the present exemplary embodiment, a structure in which the multilayer electronic component 100 includes two external electrodes 131 and 132 is described, but the number, the shape, and the like of the external electrodes 131 and 132 may be changed depending on the shape of the internal electrodes 121 and 122, or other purpose.

In order to secure excellent bending strength, a structure in which the external electrodes 131 and 132 include conductive resin layers 131b and 132b has been suggested, and as the resin included in the conductive resin layer of the external electrode, a bisphenol A (BPA)-based resin is commonly used.

Figure 10:
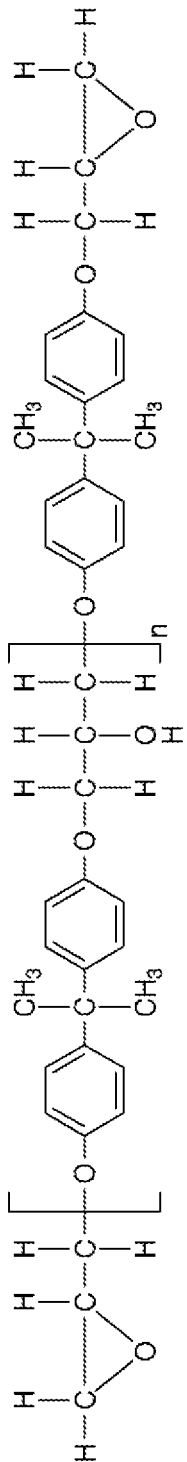
FIG. 10 is a structural formula of DGEBA.
Figure 11:
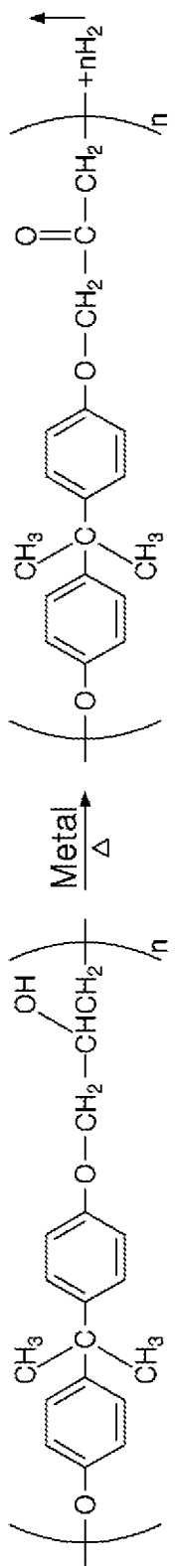
FIG. 11 is a formula showing an oxidation reaction of an alcohol group.

A representative example of the bisphenol A-based resin included in the conductive resin layer of the external electrode includes bisphenol A diglycidyl ether (DGEBA). Referring to FIG. 10 illustrating a DGEBA structure, DGEBA has an epoxy group (C—O—C) at the end of a polymer, and has many alcohol groups (—OH) in the back bone structure of the polymer for increasing adhesiveness and reactivity. An alcohol group forms adhesiveness by a hydrogen bond, and may be also used as a chemical reaction group as a shared electron pair of oxygen. However, when an oxidation reaction of the alcohol group occurs in the presence of a metal catalyst under high-temperature conditions as shown in FIG. 11, the number of alcohol groups is decreased to decrease adhesive strength between a body and an electrode layer, and a gas by-product such as hydrogen and carbon dioxide is located between the electrode layer and the conductive resin layer to cause lifting and bursting defects of an external electrode. Here, the metal catalyst may be conductive metal particles included in a conductive resin layer composition, and the high-temperature conditions refer to 200° C. to 400° C.

Thus, in the present invention, a ratio between an aromatic ring peak intensity and an alcohol (—OH) peak intensity which are observed in a Fourier transform infrared spectroscopy (FT-IR) analysis of the conductive resin layer is controlled, thereby suppressing oxidation of the conductive resin layers 131b and 132b to suppress the lifting and bursting defects of the external electrodes 131 and 132 and secure excellent adhesive strength.

Peaks observed on a biaxial graph including a relationship curve illustrating a relationship of spectrum intensity to a wave number of the conductive resin layers 131b and 132b obtained by the FT-IR analysis include an aromatic ring peak, an alcohol (—OH) peak, a carbonyl (C=O) peak, and the like. FT-IR is an abbreviation of Fourier Transform-Infrared, and refers to a Fourier transform infrared spectroscope. Here, when the conductive resin layers 131b and 132b are disposed inside the external electrode, the conductive resin layer 131b disposed on the third surface of the body is exposed by a destructive physical analysis (DPA), as shown in FIG. 5, and then the exposed conductive resin layer 131b may be analyzed by the FT-IR equipment, and the spectral range of the FT-IR equipment may be set to 4000 to 650 $cm^{-1}$.

Referring to FIG. 6, the aromatic ring peak intensity may be defined as, when a reference line La connecting spectrum intensity at a wave number of 1420 $cm^{-1}$ and spectrum intensity at a wave number of 1520 $cm^{-1}$ is drawn, a maximum size in a direction parallel to the spectrum intensity axis from La to the relationship curve in the wave number area of 1420 $cm^{-1}$ to 1520 $cm^{-1}$, which is, hereinafter, referred to as "A". In addition, the carbonyl (C=O) peak intensity may be defined as, when a reference line Lb connecting spectrum intensity at a wave number of 1650 $cm^{-1}$ and spectrum intensity at a wave number of 1800 $cm^{-1}$ is drawn, a maximum size in a direction parallel to the spectrum intensity axis from Lb to the relationship curve in the wave number area of 1650 $cm^{-1}$ to 1800 $cm^{-1}$, which is, hereinafter, referred to as "B".

Referring to FIG. 7, the alcohol (—OH) peak intensity may be defined as, when a reference line Lc connecting spectrum intensity at a wave number of 3100 $cm^{-1}$ and spectrum intensity at a wave number of 3700 $cm^{-1}$ is drawn, a maximum size in a direction parallel to the spectrum intensity axis from Lc to the relationship curve in the wave number area of 3100 $cm^{-1}$ to 3700 $cm^{-1}$, which is, hereinafter, referred to as "C".

In FIGS. 6 and 7, the x-axis is a wave number, of which the unit is $cm^{-1}$, and the y-axis is spectrum intensity, of which the unit is a.u. (arbitrary unit).

According to an exemplary embodiment of the present disclosure, the external electrodes 131 and 132 are disposed on the body 110 and includes the conductive resin layers 131b and 132b including a conductive metal and a resin, and in the two-axis graph including a relationship curve illustrating a relationship of the spectrum intensity to the wave number of the conductive resin layer obtained by the FT-IR analysis, A and C satisfy: $0.337 \leq 2*C/A \leq 0.367$, and thus, the lifting and bursting defects of the external electrode are suppressed and excellent adhesive strength may be secured.

When 2*C/A is more than 0.367, the lifting and bursting defects of the external electrode may occur. However, when 2*C/A is less than 0.337, the adhesive strength of the external electrode may be decreased, and thus, 2*C/A may be preferably 0.337 or more, and for securing better adhesive strength, 2*C/A may be more preferably 0.344 or more.

In an exemplary embodiment, A and B may satisfy: $B/A \leq 0.14$. More preferably, A and B may satisfy: $0.048 \leq B/A \leq 0.14$, and still more preferably A and B may satisfy: $0.07 \leq B/A \leq 0.14$.

A carbonyl peak intensity (B) is not observed before the conductive resin layer is cured, but after the conductive resin layer is cured, when the lifting and bursting defects of the external electrode occur, the carbonyl peak intensity (B) may be observed in the FT-IR analysis of the conductive resin layer. The carbonyl (C=O) peak may occur when a resin in the conductive resin layer is oxidized in a curing process, and the oxidation of the resin may be a main cause to produce $CO_2$.

Figure 8:
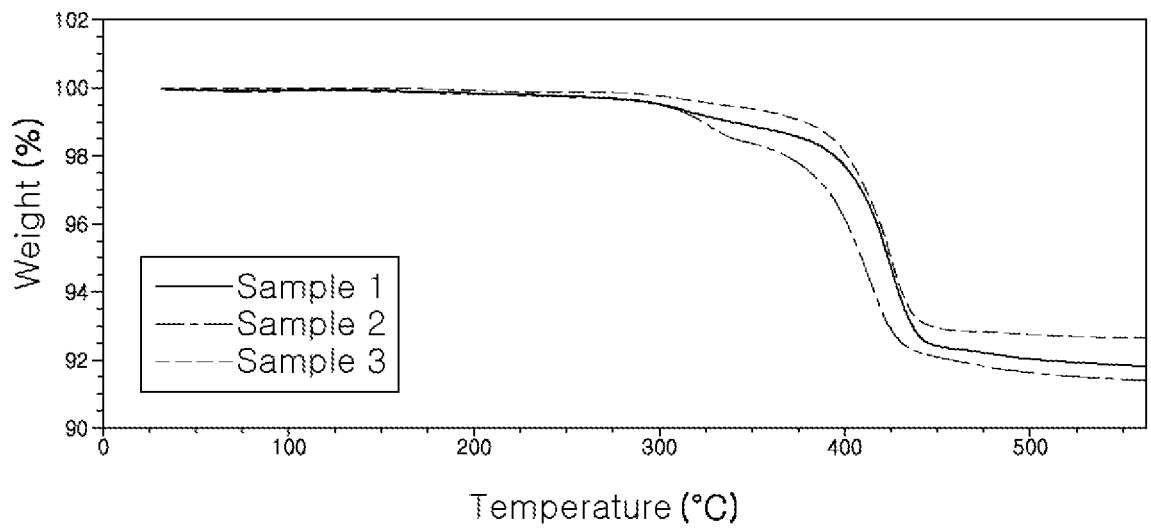
FIG. 8 is the results of a TGA analysis for a chip having a lifting defect of an external electrode (Samples 1 and 2) and a chip having no lifting defect of an external electrode (Sample 3)
Figure 9:
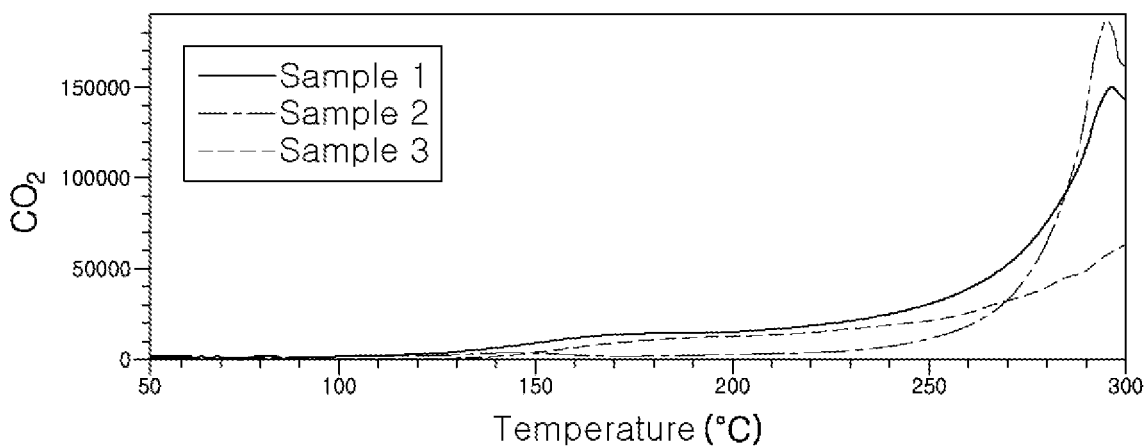
FIG. 9 is the results of an EGA-MS analysis for a chip having a lifting defect of an external electrode (Samples 1 and 2) and a chip having no lifting defect of an external electrode (Sample 3)

FIG. 8 is the results of a TGA analysis for a chip having a lifting defect of the external electrode (Samples 1 and 2) and a chip having no lifting defect of the external electrode (Sample 3); and FIG. 9 is the results of an EGA-MS analysis for a chip having a lifting defect of an external electrode (Samples 1 and 2) and a chip having no lifting defect of an external electrode (Sample 3). Referring to FIG. 8, it may be confirmed that the chip having the lifting defect of the external electrode (Samples 1 and 2) has a more rapid thermal decomposition starting temperature than the chip starting to be thermally decomposed before 300° C. to have no lifting defect (Sample 3), and referring to FIG. 9, it may be confirmed that Samples 1 and 2 has a large amount of $CO_2$ near 300° C. Therefore, as the carbonyl peak intensity (B) is smaller, the oxidation of the resin is suppressed to decrease a $CO_2$ emission, so that the lifting and bursting defects of the external electrode may be suppressed.

When B/A is more than 0.14, the oxidation of the resin occurs a lot to cause the lifting and bursting defects of the external electrode, and thus, B/A may be more preferably 0.14 or less. However, when B/A is less than 0.048, the adhesive strength of the external electrode may be decreased, and thus, B/A may be preferably 0.048 or more, and for securing better adhesive strength, B/A may be more preferably 0.07 or more.

In an exemplary embodiment, the conductive resin layers 131b and 132b may include a bisphenol A-based resin and a biphenyl-based resin.

Bisphenol A refers to a diphenyl methane-based compound represented by a molecular formula of $C_{15}H_{16}O_2$ and a chemical structural formula of $(CH_3)_2C(C_6H_4OH)_2$, which is often referred to as BPA. A bisphenol A-based resin refers to a polymer compound produced by a polymerization reaction of bisphenol A. A representative bisphenol A-based resin includes bisphenol A diglycidyl ether (DGEBA).

Referring to FIG. 10 illustrating a DGEBA structure, DGEBA has an epoxy group (C—O—C) at the end of a polymer, and has an alcohol group (—OH) in the back bone structure of the polymer for increasing adhesiveness and reactivity.

Figure 12:
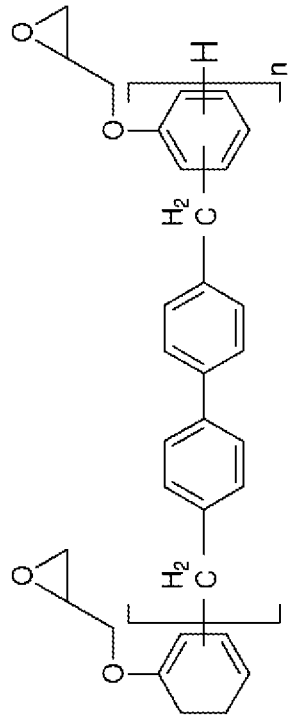
FIG. 12 is a structural formula of a biphenyl-based resin.

Biphenyl is also referred to as diphenyl, and has a structure in which two phenyl (—$C_6H_5$) groups, represented by the Chemical Formula $C_{12}H_{10}$, are connected to each other. A biphenyl-based resin refers to a polymer compound produced by a polymerization reaction of biphenyl. An example of the biphenyl-based resin includes 4,4'-diglycidyl biphenyl novolac epoxy. Referring to FIG. 12 showing a biphenyl-based resin structure, there is no alcohol group in the back bone structure, and there is an epoxy group (C—O—C) in the end of the polymer. Since the bisphenol A-based resin and the biphenyl-based resin are mixed, the number of alcohol groups in the polymer resin is adjusted to suppress the oxidation of the resin and secure adhesiveness and reactivity, thereby securing adhesive strength.

Figure 13:
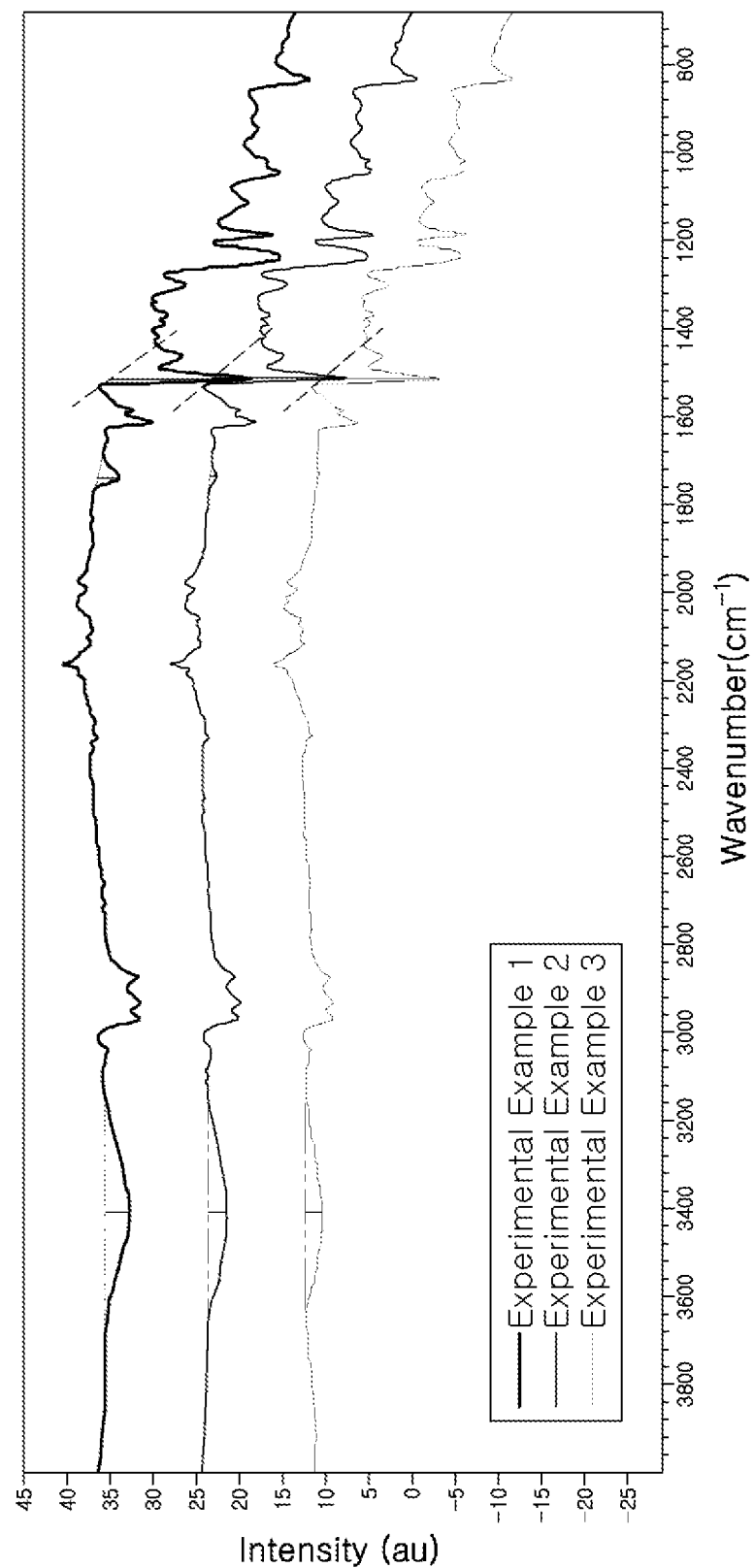
FIG. 13 is a graph showing each relationship curve for comparison, the relationship curves being obtained in FT-IR analysis when the resin included in a conductive resin layer is a bisphenol A-based resin (Experimental Example 1), when the resin included in a conductive resin layer includes 50 wt % of a bisphenol A-based resin and 50 wt % of a biphenyl-based resin (Experimental Example 2), and when the resin included in a conductive resin layer is a biphenyl-based resin (Experimental Example 3)

FIG. 13 is a graph showing each relationship curve for comparison, the relationship curves being obtained in FT-IR analysis when the resin included in a conductive resin layer is a bisphenol A-based resin (Experimental Example 1), when the resin included in a conductive resin layer includes 50 wt % of a bisphenol A-based resin and 50 wt % of a biphenyl-based resin (Experimental Example 2), and when the resin included in a conductive resin layer is a biphenyl-based resin (Experimental Example 3). In addition, each relationship curve was analyzed, and an aromatic ring peak intensity (A), a carbonyl peak intensity (B), an alcohol peak intensity (C), 2*C/A, and B/A were measured and are shown in the following Table 1:

TABLE 1

| Classification | C | 2*C/A | B | B/A | A |
|---|---|---|---|---|---|
| Experimental Example 1 | 0.440 | 0.374 | 0.380 | 0.162 | 2.35 |
| Experimental Example 2 | 0.350 | 0.333 | 0.100 | 0.048 | 2.1 |
| Experimental Example 3 | 0.290 | 0.299 | 0.000 | 0.000 | 1.94 |

Referring to FIG. 13 and Table 1, it may be confirmed that A, B, and C values vary depending on the kind and mixing of the resin, and when the bisphenol A-based resin and the biphenyl-based resin are mixed, A and C satisfy: 0.337≤2*C/A≤0.367, and A and B satisfy: B/A≤0.14.

Therefore, when the conductive resin layers 131b and 132b include the bisphenol A-based resin and the biphenyl-based resin, the lifting and bursting defects of the external electrode are suppressed and excellent adhesive strength may be secured.

Here, a ratio of the content of the biphenyl-based resin with respect to the total content of the bisphenol A-based resin and the biphenyl-based resin included in the conductive resin layers 131b and 132b may be 10 wt % or more and 50 wt % or less.

When the content ratio of the biphenyl-based resin is less than 10 wt %, the effect of suppressing the oxidation of the resin may be insufficient, so that the lifting and bursting defects of the external electrode may occur.

However, when the content ratio of the biphenyl-based resin is more than 50 wt %, the number of alcohol groups (—OH) in the conductive resin layer is small, so that the adhesive strength of the external electrode may be decreased due to the lack of adhesive strength. Therefore, it may be preferred that the content ratio of the biphenyl-based resin is 50 wt % or less, and it may be more preferred that the content ratio of the biphenyl-based resin is 40 wt % or less for securing better adhesive strength.

In an exemplary embodiment, in a GC-MS analysis of the conductive resin layers 131b and 132b, a bisphenol A peak is detected and one or more of a methyl-biphenyl peak or a dimethyl-biphenyl peak may be detected. GC-MS refers to gas chromatograph-mass spectrometer.

Figure 14:
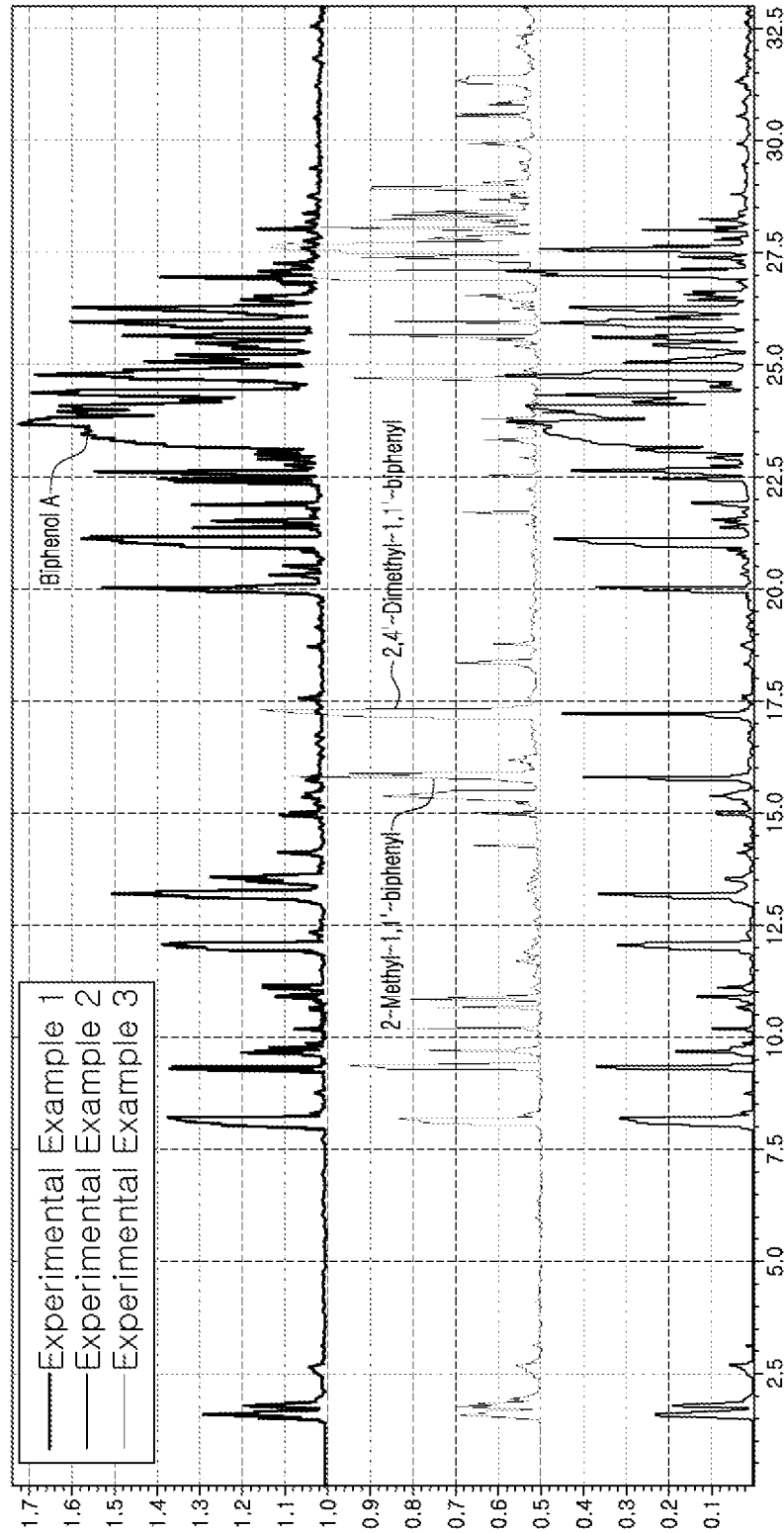
FIG. 14 is GC-MS analysis results for a bisphenol A-based resin (Experimental Example 1), a biphenyl-based resin (Experimental Example 3), and a mixture thereof (Experimental Example 2).

Referring to FIG. 14, it is found that a bisphenol A peak is detected in a retention time between 22.5 min and 25.0 min from the bisphenol A-based resin, and a methyl-biphenyl peak and a dimethyl-biphenyl peak are detected in a retention time of 15-18 min from the biphenyl-based resin. When the bisphenol A-based resin and the biphenyl-based resin are mixed, it is confirmed that all of a bisphenol A peak, a methyl-biphenyl peak, and a dimethyl-biphenyl peak are observed. In FIG. 14, the x-axis is a retention time (min) and the y-axis is an absolute unit.

However, when unique peaks shown only in the bisphenol A-based resin and unique peaks shown only in the biphenyl-based resin are detected at the same time, in addition to the bisphenol A peak, the methyl-biphenyl peak, and the dimethyl-biphenyl peak, it may be proven that both the bisphenol A-based resin and the biphenyl-based resin are included in the conductive resin layers 131b and 132b.

As the conductive metal included in the conductive resin layers 131b and 132b, a material having excellent electrical conductivity may be used, but the present disclosure is not particularly limited thereto. For example, the conductive metal may include one or more selected from the group consisting of nickel (Ni), copper (Cu), palladium (Pd), silver (Ag), gold (Au), platinum (Pt), tin (Sn), tungsten (W), titanium (Ti), and alloys thereof.

The conductive metal included in the conductive resin layers 131b and 132b may include one or more of spherical particles or flake-like particles. That is, the conductive metal may be formed of flake-like particles only, spherical particles only, or flake-like particles and spherical particles in combination. Here, the spherical particles may also include a shape which is not perfectly spherical, and for example, may include a shape having a length ratio between a long axis and a short axis (long axis/short axis) of 1.45 or less. The flaks-like particles refer to particles having a flat and elongated shape, and though is not particularly limited thereto, for example, may have a length ratio between a long axis and a short axis (long axis/short axis) of 1.95 or more. The lengths of the long axis and the short axis of the spherical particles and the flake-like particles may be measured from images obtained by scanning the cross sections in a first direction and a second direction (L-T cross section) cut at the center in a third direction of a ceramic electronic component by a scanning electron microscope (SEM).

In addition, the conductive metal included in the conductive resin layers 131b and 132b may include a plurality of metal particles and an intermetallic compound. That is, the conductive resin layers 131b and 132b may include a plurality of metal particles, an intermetallic compound, and a resin. Since the intermetallic compound is included, electrical connectivity with the electrode layers 131a and 132a may be further improved. The intermetallic compound may serve to connect a plurality of metal particles to improve electrical connectivity, and may perform a role of surrounding a plurality of metal particle and connecting them to each other.

Here, the intermetallic compound may include a metal having a melting point lower than a curing temperature of a resin. That is, since the intermetallic compound includes a metal having a melting point lower than the curing temperature of a resin, the metal having a melting point lower than the curing temperature of the resin is melted in drying and curing processes, and forms an intermetallic compound with a part of the metal particles to surround the metal particles. Here, the intermetallic compound may include a low-melting point metal of preferably 300° C. or lower.

For example, Sn having a melting point of 213 to 220° C. may be included. Sn is melted in drying and curing processes, and the melted Sn soaks metal particles having a high melting point such as Ag, Ni, or Cu by a capillary phenomenon and reacts with a part of Ag, Ni, or Cu metal particles to form an intermetallic compound such as $Ag_3Sn$, $Ni_3Sn_4$, $Cu_6Sn_5$, and $Cu_3Sn$. Ag, Ni, or Cu which does not participate the reaction remains in a metal particle form.

Therefore, the plurality of metal particles include one or more of Ag, Ni, or Cu, and the intermetallic compound may include one or more of $Ag_3Sn$, $Ni_3Sn_4$, $Cu_6Sn_5$, or $Cu_3Sn$.

In an exemplary embodiment, the external electrodes 131 and 132 may include electrode layers 131a and 132a disposed on the body 110, as well as the conductive resin layers 131b and 132b, and the conductive resin layers 131b and 132b may be disposed on the electrode layers.

The lifting defect of the external electrodes 131 and 132 may mainly occur in an interface between the electrode layers 131a and 132a and the conductive resin layers 131b and 132b, when the component has a structure in which the conductive resin layers 131b and 132b are disposed on the electrode layers 131a and 132a, the effect of suppressing the lifting defect of the present disclosure may be more significant.

The electrode layers 131a and 132a may be a firing electrode including a conductive metal and a glass. When the electrode layers 131a and 132a include a conductive metal and a glass, a binding force between the body and the external electrode may be improved, and the effect of suppressing the lifting defect of the present disclosure may be more significant.

The conductive metal used in the electrode layers 131a and 132a is not particularly limited as long as it is a material which may be electrically connected to the internal electrode for forming capacitance, and for example, may include one or more selected from the group consisting of nickel (Ni), copper (Cu), palladium (Pd), silver (Ag), gold (Au), platinum (Pt), tin (Sn), tungsten (W), titanium (Ti), and alloys thereof. The electrode layers 131a and 132a may be formed by applying a conductive paste prepared by adding glass frit to the conductive metal powder and then firing the paste.

However, the present disclosure is not intended to be limited to the electrode layers 131a and 132a including a glass, and the electrode layers 131a and 132a may be formed by transferring a sheet including the conductive metal onto the body or formed by plating.

In an exemplary embodiment, plating layers 131c and 132c may be disposed on the conductive resin layers 131b and 132b.

The plating layers 131c and 132c serve to improve mounting characteristics. The kind of plating layers 131c and 132c is not particularly limited, and may be a plating layer including one or more of Ni, Sn, Pd, or alloys thereof, or may be formed of a plurality of layers.

As a more specific example of the plating layers 131c and 132c, the plating layers 131c and 132c may be a Ni plating layer or a Sn plating layer, the Ni plating layer and the Sn plating layer may be formed sequentially on the electrode layers 131a, 132a, 131b, and 132b, or the Sn plating layer, the Ni plating layer, and the Sn plating layer may be formed sequentially. In addition, the plating layers 131c and 132c may include a plurality of Ni plating layers and/or a plurality of Sn plating layers.

In the body 110, the dielectric layer 111 and the internal electrodes 121 and 122 are alternately laminated.

The specific shape of the body 110 is not particularly limited, but the body 110 may be formed of a hexahedron shape or similar shape, as shown. In a firing process, due to the shrinkage of ceramic powder included in the body 110, the body 110 may have not a hexahedron shape with perfect straight lines, but a substantial hexahedron shape.

The body 110 may have first and second surfaces 1 and 2 which oppose each other in a first direction, third and fourth surfaces 3 and 4 which are connected to the first and second surfaces 1 and 2 and oppose each other in a second direction, and fifth and sixth surfaces 5 and 6 which are connected to the first and second surface 1 and 2 and the third and fourth surfaces 3 and 4 and oppose each other in a third direction.

In an exemplary embodiment, the body 110 includes a corner 1-3 connecting the first surface and the third surface, a corner 1-4 connecting the first surface and the fourth surface, a corner 2-3 connecting the second surface and the third surface, and a corner 2-4 connecting the second surface and the fourth surface, and as the corner 1-3 and the corner 2-3 approach the third surface, they may have a shape constricted to the center in the first direction of the body, and as the corner 1-4 and the corner 2-4 approach the fourth surface, they may have a shape constricted to the center in the first direction of the body.

Since margin areas where the internal electrodes 121 and 122 are not disposed on the dielectric layer 111 overlap, a step by the thickness of the internal electrodes 121 and 122 occur, and thus, a corner connecting the first surface to the third to fifth surfaces and/or a corner connecting the second surface to the third to fifth surfaces may have a shape constricted toward the center in the first direction of the body 110, when viewed from the first surface or the second surface. Otherwise, by the contraction behavior in the sintering process of the body, the corner connecting the first surface 1 to the third to sixth surfaces 3, 4, 5, and 6 and/or the corner connecting the second surface 2 to the third to sixth surfaces 3, 4, 5, and 6 may have a shape constricted toward the center in the first direction of the body 110, when viewed from the first surface or the second surface. Otherwise, for preventing a chipping defect, an edge connecting each surface of the body 110 is subjected to round processing by a separate process, so that the corner connecting the first surface to the third to sixth surfaces and/or the corner connecting the second surface to the third to sixth surfaces may have a round shape.

The corners may include the corner 1-3 connecting the first surface and the third surface, the corner 1-4 connecting the first surface and the fourth surface, the corner 2-3 connecting the second surface and the third surface, and the corner 2-4 connecting the second surface and the fourth surface. In addition, the corners may include a corner 1-5 connecting the first surface and the fifth surface, a corner 1-6 connecting the first surface and the sixth surface, a 2-5 corner connecting the second surface and the fifth surface, and a corner 2-6 connecting the second surface and the sixth surface. The first to sixth surfaces of the body 110 may be a largely flat surface, and an area which is not flat may be regarded as a corner. Hereinafter, an extension line of each surface may refer to an extending line based on a flat part of each surface.

Here, an area disposed on the corner of the body 110 in the external electrodes 131 and 132 may be a corner part, an area disposed on the third and fourth surfaces of the body 110 may be a connection part, and an area disposed on the first and second surfaces of the body may be a band part.

Meanwhile, when in order to suppress a step by the internal electrodes 121 and 122, the body is cut so that the internal electrode is exposed to the fifth and sixth surfaces 5 and 6 of the body after lamination, and then a single dielectric layer or two or more dielectric layers are laminated in the third direction (width direction) on both side surfaces of a capacity forming part Ac to form margin parts 114 and 115, a part connecting the first surface to the fifth and sixth surfaces and a part connecting the second surface to the fifth and sixth surfaces may not have a constricted shape.

A plurality of dielectric layers 111 forming the body 110 is in a fired state, and a boundary between the adjacent dielectric layers 111 may be integrated so that it is difficult to confirm the boundary without using a scanning electron microscope (SEM).

According to an exemplary embodiment in the present disclosure, a raw material which forms the dielectric layer 111 is not particularly limited as long as a sufficient capacitance may be obtained. For example, a barium titanate-based material, a lead composited perovskite-based material, a strontium titanate-based material, or the like may be used. The barium titanate-based material may include $BaTiO_3$-based ceramic powder, and an example of the ceramic powder may include $BaTiO_3$, $(Ba_{1-x}Ca_x) TiO_3$ $(0<x<1)$, $Ba(Ti_{1-y}Ca_y)O_3$ $(0<y<1)$, $(Ba_{1-x}Ca_x) (Ti_{1-y}Zr_y)O_3$ $(0<x<1, 0<y<1)$, or $Ba(Ti_{1-y}Zr_y)O_3$ $(0<y<1)$ in which calcium (Ca), zirconium (Zr), or the like is partially solid-solubilized in $BaTiO_3$, or the like.

In addition, the raw material which forms the dielectric layer 111 may be prepared by adding various ceramic additives, organic solvents, binders, dispersing agents, and the like, to powder such as the barium titanate ($BaTiO_3$) according to the purpose of the present disclosure.

The body 110 may include a capacity forming part Ac which includes a first internal electrode 121 and a second internal electrode 122, which are disposed inside the body 110 and are disposed to oppose each other with the dielectric layer 111 interposed therebetween, to form a capacity, and cover parts 112 and 113 formed in the upper portion and the lower portion in the first direction of the capacity forming part Ac.

In addition, the capacity forming part Ac, which is a part contributing to capacity formation of a capacitor, may be formed by repeatedly laminating a plurality of first and second internal electrodes 121 and 122, having the dielectric layer 111 therebetween.

The cover parts 112 and 113 may include an upper cover part 112 disposed on the upper portion in the first direction of the capacity forming part Ac and a lower cover part 113 disposed on the lower portion in the first direction of the capacity forming part Ac.

The upper cover part 112 and the lower cover part 113 may be formed by laminating a single dielectric layer or two or more dielectric layers in the thickness direction, respectively, on the upper and lower surfaces of the capacity forming part Ac, and basically, may serve to prevent damage of the internal electrode by a physical or chemical stress.

The upper cover part 112 and the lower cover part 113 do not include the internal electrode, and may include the same material as the dielectric layer 111.

That is, the upper cover part 112 and the lower cover part 113 may include a ceramic material, and for example, may include a barium titanate ($BaTiO_3$)-based ceramic material.

In addition, margin parts 114 and 115 may be disposed on the side surface of the capacity forming part Ac.

The margin parts 114 and 115 may include a first margin part 114 disposed on the fifth surface 5 and a second margin part 115 disposed on the sixth surface 6 of the body 110. That is, the margin parts 114 and 115 may be disposed on both end surfaces in the width direction of the body 110.

The margin parts 114 and 115 may refer to an area between both ends of the first and second internal electrodes 121 and 122 and the boundary of the body 110 in a cross section cut in the width-thickness (W-T) direction of the body 110, as shown in FIG. 3.

The margin parts 114 and 115 may basically serve to prevent the damage of the internal electrode by a physical or chemical stress.

The margin parts 114 and 115 may be formed by applying a conductive paste on a ceramic green sheet except an area, in which the margin part is to be formed, to form an internal electrode.

In addition, in order to suppress a step by the internal electrodes 121 and 122, the body is cut so that the internal electrode is exposed to the fifth and sixth surfaces 5 and 6 of the body after lamination, and the single dielectric layer or two or more dielectric layers are laminated on both side surfaces of the capacity forming part Ac in the third direction (width direction), thereby forming the margin parts 114 and 115.

The internal electrodes 121 and 122 may be disposed alternately with the dielectric layer 111.

The internal electrodes 121 and 122 may include the first and second internal electrodes 121 and 122. The first and second internal electrodes 121 and 122 are disposed alternately so that they oppose each other with the dielectric layer 111 configuring the body 110 interposed therebetween, and may be exposed to the third and fourth surfaces 3 and 4 of the body 110, respectively.

Referring to FIG. 2, the first internal electrode 121 may be separated from the fourth surface 4 and exposed through the third surface 3, and the second internal electrode 122 may be separated from the third surface 3 and exposed through the fourth surface 4. A first basic electrode layer 131 may be disposed on the third surface 3 of the body and connected to the first internal electrode 121, and a second basic electrode layer 132 may be disposed on the fourth surface 4 of the body and connected to the second internal electrode 122.

That is, the first internal electrode 121 is not connected to the second basic electrode layer 132 but connected to the first basic electrode layer 131, and the second internal electrode 122 is not connected to the first basic electrode layer 131 but connected to the second basic electrode layer 132. Therefore, the first internal electrode 121 may be formed to be separated at a certain distance from the fourth surface 4, and the second internal electrode 122 may be formed to be separated at a certain distance from the third surface 3.

Here, the first and second internal electrodes 121 and 122 may be electrically separated from each other by the dielectric layer 111 disposed therebetween.

The body 110 may be formed by laminating a ceramic green sheet on which the first internal electrode 121 is printed and a ceramic green sheet on which the second internal electrode 122 is printed alternately, and then firing the laminate.

The material which forms the internal electrodes 121 and 122 is not particularly limited, and a material having excellent electrical conductivity may be used. For example, the internal electrodes 121 and 122 may include one or more of nickel (Ni), copper (Cu), palladium (Pd), silver (Ag), gold (Au), platinum (Pt), tin (Sn), tungsten (W), titanium (Ti), or alloys thereof.

In addition, the internal electrodes 121 and 122 may be formed by printing a conductive paste for an internal electrode including one or more of nickel (Ni), copper (Cu), palladium (Pd), silver (Ag), gold (Au), platinum (Pt), tin (Sn), tungsten (W), titanium (Ti), or alloys thereof on a ceramic green sheet. As a method of printing the conductive paste for an internal electrode, a screen printing method, a gravure printing method, or the like may be used, but the present disclosure is not limited thereto.

There is no need to particularly limit the average thickness td of the dielectric layer 111 and the average thickness to of the internal electrodes 121 and 122.

However, in an exemplary embodiment, the average thickness td of the dielectric layer 111 and the average thickness te of the internal electrodes 121 and 122 may satisfy: td>2*te. That is, according to an exemplary embodiment, the average thickness td of the dielectric layer 111 may be characterized by being greater than twice the average thickness te of the internal electrodes 121 and 122.

In general, in an electronic component for high-voltage electrical equipment, a reliability problem due to a lowered dielectric breakdown voltage under a high-voltage environment is an important issue. The multilayer electronic component according to an exemplary embodiment may have the average thickness td of the dielectric layer 111 which is more than twice the average thickness te of the internal electrodes 121 and 122 in order to prevent the lowering of the dielectric breakdown voltage under a high-voltage environment, thereby increasing the thickness of the dielectric layer which is a distance between the internal electrodes to improve the dielectric breakdown voltage characteristics. When the average thickness td of the dielectric layer 111 is twice or less the average thickness te of the internal electrodes 121 and 122, the thickness of the dielectric layer which is a distance between the internal electrodes is small so that the dielectric breakdown voltage may be lowered. Here, the average thickness te of the internal electrode may be less than 1 μm, and the average thickness td of the dielectric layer may be less than 2.8 μm, but they are not necessarily limited thereto.

The average thickness td of the dielectric layer 111 and the average thickness to of the internal electrode may be measured by scanning an image of the cross section in the length and thickness direction (L-T) of the body 110 with a scanning electron microscope (SEM) at a magnification of 10,000 times. More specifically, the thickness of one dielectric layer internal electrode may be measured at 30 points equally spaced in the length direction on a scanned image, and the average value thereof may be measured. The 30 equally spaced points may be designated in the capacity forming part Ac. In addition, when the average value measurement is expanded to 10 dielectric layers and internal electrodes, the average thickness of the dielectric layer and the average thickness of the internal electrode may be further normalized. Other measurement methods and/or tools appreciated by one of ordinary skill in the art, even if not described in the present disclosure, may also be used.

Examples

2*C/A and B/A, the number of adhesive strength defects, and the number of lifting defects depending on the mixing ratio of the bisphenol A-based resin and the biphenyl-based resin included in the conductive resin layers 131b and 132b were measured and are shown in the following Table 2.

First, a sample chip in which a fired electrode had been formed was prepared, a paste satisfying the resin mixing ratio of Table 2 was applied, and dried. Thereafter, a curing heat treatment was performed at 200° C. or higher and 300° C. or lower to prepare a sample chip in which a conductive resin layer was formed.

2*C/A and B/A were calculated from the relationship curve of spectrum intensity to a wave number obtained by FT-IR analysis of the conductive resin layer of each sample chip, and a spectral range was designated as 4000 to 650 $cm^{-1}$.

The number of adhesive strength defects were obtained by mounting 20 samples per each test number on a substrate, applying a shear stress of 18 N with a press tool for 60 seconds, determining the case in which the sample was separated from the substrate or shearing occurred in the sample as bad, and writing the number of bad samples.

The number of lifting defects were obtained by mounting 20 samples per each test number on a substrate, putting the substrate into a reflow oven at 260° C. or higher, and repeating the process three times or more. Thereafter, the substrate in which the sample was mounted was analyzed by X-ray, and when the interface between the electrode layer and the conductive resin layer of the sample was open, it was determined as occurrence of a lifting defect, and the number of bad samples was written.

TABLE 2

| Test No. | Bisphenol A-based resin content (wt %) | Biphenyl-based resin content (wt %) | 2*C/A | B/A | Number of adhesive strength defects | Number of lifting defects |
|---|---|---|---|---|---|---|
| 1 | 100 | 0 | 0.374 | 0.16 | 0 | 4 |
| 2 | 90 | 10 | 0.367 | 0.14 | 0 | 0 |
| 3 | 60 | 40 | 0.344 | 0.07 | 0 | 0 |
| 4 | 50 | 50 | 0.337 | 0.048 | 2 | 0 |
| 5 | 0 | 100 | 0.299 | 0 | 7 | 0 |

It was confirmed that Test Nos. 2 to 4 satisfied 2*C/A of 0.337 or more and 0.367 or less, and thus, had excellent adhesive strength and had no defect.

Test No. 1 having 2*C/A of more than 0.367 had many lifting defects, and Test No. 5 having 2*C/A of less than 0.337 had no lifting defect but many adhesive strength defects.

Therefore, it was confirmed that in order to suppress lifting defects and secure excellent adhesive strength, 2*C/A should satisfy 0.337 or more and 0.367 or less in the relationship curve of the spectrum intensity to the wave number obtained by the FT-IR analysis of the resin layer.

Meanwhile, though Test No. 4 had good adhesive strength defects of 10% or less, it was found that it is more preferred that 2*C/A should satisfy 0.344 or more and 0.367 or less like Test Nos. 2 and 3, in order to secure excellent adhesive strength.

In addition, Test Nos. 2 to 4 in which the bisphenol A-based resin and the biphenyl-based resin were mixed satisfied 2*C/A of 0.337 or more and 0.367 or less.

In addition, as the content ratio of the biphenyl-based resin was increased, 2*C/A was decreased, and a trend that the lifting defects were suppressed, but the adhesive strength was deteriorated was confirmed therefrom.

One of the various effects of the present disclosure is controlling the ratios of peaks measured from a relationship curve of spectrum intensity to a wave number of a conductive resin layer obtained by FT-IR analysis to suppress lifting and bursting defects of an external electrode.

One of the various effects of the present disclosure is including both of a bisphenol A-based resin and a biphenyl-based resin in a conductive resin layer to suppress lifting and bursting defects of an external electrode.

However, the various and beneficial merits and effects of the present disclosure are not limited to the descriptions above, and may be more easily understood in a process of describing specific exemplary embodiments in the present disclosure.

Though the exemplary embodiments in the present disclosure have been described in detail above, the present disclosure is not limited by the exemplary embodiments described above, and the accompanying drawings, and is defined by the appended claims. Accordingly, various substitution, modifications and alteration may be made within the scope of the present disclosure may be made by those skilled in the art without departing from the spirit of the prevent disclosure defined by the accompanying claims.

In addition, the expression "an exemplary embodiment" used in the present specification does not mean the same exemplary embodiment with each other, and is provided for describing unique characteristics different from each other. However, an exemplary embodiment suggested above does not exclude implementation of a combination with the characteristics of other exemplary embodiments. For example, though the matter described in a certain exemplary embodiment is not described in another exemplary embodiments, it may be understood as the description related to another exemplary, unless otherwise stated contrary to or contradictory with the matter. Terms used in the present disclosure are used only for describing an exemplary embodiment, and is not intended to limit the present disclosure. Here, singular forms are intended to include plural forms unless otherwise indicated contextually.

While exemplary embodiments have been shown and described above, it will be apparent to those skilled in the art that modifications and variations could be made without departing from the scope of the present invention as defined by the appended claims.

What is claimed is:

1. A multilayer electronic component comprising: a body including a dielectric layer and an internal electrode, and an external electrode disposed on the body,
    wherein the external electrode includes a conductive resin layer including a conductive metal and a resin, and
    on a biaxial graph including a relationship curve illustrating a relationship of spectrum intensity to a wave number of the conductive resin layer, obtained by Fourier transform infrared spectroscopy (FT-IR) analysis,
    when a reference line La connecting spectrum intensity at a wave number of 1420 cm$^{-1}$ and spectrum intensity at a wave number of 1520 cm$^{-1}$ on the relationship curve is drawn and a maximum size in a direction parallel to a spectrum intensity axis from La to the relationship curve in a wave number area of 1420 cm$^{-1}$ to 1520 cm$^{-1}$ is A, and
    a reference line Lc connecting spectrum intensity at a wave number of 3100 cm$^{-1}$ and spectrum intensity at a wave number of 3700 cm$^{-1}$ on the relationship curve is drawn and a maximum size in the direction parallel to the spectrum intensity axis from Lc to the relationship curve in a wave number area of 3100 cm$^{-1}$ to 3700 cm$^{-1}$ is C,
    A and C satisfy: $0.337 \leq 2*C/A \leq 0.367$.

2. The multilayer electronic component of claim 1, wherein when a reference line Lb connecting spectrum intensity at a wave number of 1650 cm$^{-1}$ and spectrum intensity at a wave number of 1800 cm$^{-1}$ on the relationship curve is drawn on the biaxial graph and a maximum size in the direction parallel to the spectrum intensity axis from Lb to the relationship curve in a wave number area of 1650 cm$^{-1}$ to 1800 cm$^{-1}$ is B, A and B satisfy: $0.048 \leq B/A \leq 0.14$.

3. The multilayer electronic component of claim 2, wherein the resin of the conductive resin layer includes a bisphenol A-based resin and a biphenyl-based resin.

4. The multilayer electronic component of claim 3, wherein a ratio of a content of the biphenyl-based resin with respect to a total content of the bisphenol A-based resin and the biphenyl-based resin is 10 wt % or more and 50 wt % or less.

5. The multilayer electronic component of claim 4, wherein the external electrode is disposed on the body and includes an electrode layer including a conductive metal and a glass, and the conductive resin layer is disposed on the electrode layer.

6. The multilayer electronic component of claim 2, wherein in a gas chromatograph-mass spectrometer (GC-MS) analysis of the conductive resin layer, a bisphenol A peak is detected and one or more of a methyl-biphenyl peak or a dimethyl-biphenyl peak are detected.

7. The multilayer electronic component of claim 6, wherein the external electrode is disposed on the body and includes an electrode layer including a conductive metal and a glass, and the conductive resin layer is disposed on the electrode layer.

8. The multilayer electronic component of claim 1, wherein A and C further satisfy: $0.344 \leq 2*C/A \leq 0.367$.

9. The multilayer electronic component of claim 8, wherein when a reference line Lb connecting spectrum intensity at a wave number of 1650 cm$^{-1}$ and spectrum intensity at a wave number of 1800 cm$^{-1}$ on the relationship curve is drawn on the biaxial graph and a maximum size in the direction parallel to the spectrum intensity axis from Lb to the relationship curve in a wave number area of 1650 cm$^{-1}$ to 1800 cm$^{-1}$ is B, A and B satisfy: $0.048 \leq B/A \leq 0.14$.

10. The multilayer electronic component of claim 1, wherein the external electrode further includes an electrode layer disposed on the body and a plating layer disposed on the conductive resin layer, and the conductive resin layer is disposed on the electrode layer.

11. The multilayer electronic component of claim 10, wherein the electrode layer includes a conductive metal and a glass.

12. The multilayer electronic component of claim 11, wherein the conductive resin layer includes one or more selected from the group consisting of nickel (Ni), copper (Cu), palladium (Pd), silver (Ag), gold (Au), platinum (Pt), tin (Sn), tungsten (W), titanium (Ti), and alloys thereof.

13. The multilayer electronic component of claim 11, wherein the conductive metal included in the conductive resin layer includes a plurality of metal particles and an intermetallic compound.

14. The multilayer electronic component of claim 1, wherein an average thickness of the dielectric layer is twice or more an average thickness of the internal electrode.

15. The multilayer electronic component of claim 14, wherein the average thickness of the internal electrode is less than 1 μm, and the average thickness of the dielectric layer is less than 2.8 μm.

16. A multilayer electronic component comprising: a body including a dielectric layer and an internal electrode, and an external electrode disposed on the body,
wherein the external electrode includes an electrode layer disposed on the body and including a conductive metal and a glass and a conductive resin layer disposed on the electrode layer, and
the conductive resin layer includes a conductive metal, a bisphenol A-based resin, and a biphenyl-based resin.

17. The multilayer electronic component of claim 16, wherein in a gas chromatograph-mass spectrometer (GC-MS) analysis of the conductive resin layer, a bisphenol A peak is detected and one or more of a methyl-biphenyl peak or a dimethyl-biphenyl peak are detected.

18. The multilayer electronic component of claim 16, wherein on a biaxial graph including a relationship curve illustrating a relationship of spectrum intensity to a wave number of the conductive resin layer, obtained by Fourier transform infrared spectroscopy (FT-IR) analysis,
when a reference line La connecting spectrum intensity at a wave number of 1420 $cm^{-1}$ and spectrum intensity at a wave number of 1520 $cm^{-1}$ on the relationship curve is drawn and a maximum size in a direction parallel to a spectrum intensity axis from La to the relationship curve in a wave number area of 1420 $cm^{-1}$ to 1520 $cm^{-1}$ is A, and
a reference line Lc connecting spectrum intensity at a wave number of 3100 $cm^{-1}$ and spectrum intensity at a wave number of 3700 $cm^{-1}$ on the relationship curve is drawn and a maximum size in the direction parallel to the spectrum intensity axis from Lc to the relationship curve in a wave number area of 3100 $cm^{-1}$ to 3700 $cm^{-1}$ is C,
A and C satisfy: $0.337 \leq 2*C/A \leq 0.367$.

19. The multilayer electronic component of claim 18, wherein when a reference line Lb connecting spectrum intensity at a wave number of 1650 $cm^{-1}$ and spectrum intensity at a wave number of 1800 $cm^{-1}$ on the relationship curve is drawn on the biaxial graph and a maximum size in the direction parallel to the spectrum intensity axis from Lb to the relationship curve in a wave number area of 1650 $cm^{-1}$ to 1800 $cm^{-1}$ is B, A and B satisfy: $0.048 \leq B/A \leq 0.14$.

20. The multilayer electronic component of claim 18, wherein when a reference line Lb connecting spectrum intensity at a wave number of 1650 $cm^{-1}$ and spectrum intensity at a wave number of 1800 $cm^{-1}$ on the relationship curve is drawn on the biaxial graph and a maximum size in the direction parallel to the spectrum intensity axis from Lb to the relationship curve in a wave number area of 1650 $cm^{-1}$ to 1800 $cm^{-1}$ is B, A and B satisfy: $0.07 \leq B/A \leq 0.14$.

21. The multilayer electronic component of claim 16, wherein a ratio of a content of the biphenyl-based resin with respect to a total content of the bisphenol A-based resin and the biphenyl-based resin is 10 wt % or more and 50 wt % or less.

22. The multilayer electronic component of claim 16, wherein on a biaxial graph including a relationship curve illustrating a relationship of spectrum intensity to a wave number of the conductive resin layer obtained by Fourier transform infrared spectroscopy (FT-IR) analysis,
when a reference line La connecting spectrum intensity at a wave number of 1420 $cm^{-1}$ and spectrum intensity at a wave number of 1520 $cm^{-1}$ on the relationship curve is drawn and a maximum size in a direction parallel to a spectrum intensity axis from La to the relationship curve in a wave number area of 1420 $cm^{-1}$ to 1520 $cm^{-1}$ is A, and
a reference line Lc connecting spectrum intensity at a wave number of 3100 $cm^{-1}$ and spectrum intensity at a wave number of 3700 $cm^{-1}$ on the relationship curve is drawn and a maximum size in the direction parallel to the spectrum intensity axis from Lc to the relationship curve in a wave number area of 3100 $cm^{-1}$ to 3700 $cm^{-1}$ is C,
A and C satisfy: $0.344 \leq 2*C/A \leq 0.367$.

23. The multilayer electronic component of claim 16, wherein a ratio of a content of the biphenyl-based resin with respect to a total content of the bisphenol A-based resin and the biphenyl-based resin is 10 wt % or more and 40 wt % or less.

24. A multilayer electronic component comprising: a body including a dielectric layer and an internal electrode, and an external electrode disposed on the body,
wherein the external electrode includes a conductive resin layer including a conductive metal and a resin, and
on a biaxial graph including a relationship curve illustrating a relationship of spectrum intensity to a wave number of the conductive resin layer, obtained by Fourier transform infrared spectroscopy (FT-IR) analysis,
when a reference line La connecting spectrum intensity at a wave number of 1420 $cm^{-1}$ and spectrum intensity at a wave number of 1520 $cm^{-1}$ on the relationship curve is drawn and a maximum size in a direction parallel to a spectrum intensity axis from La to the relationship curve in a wave number area of 1420 $cm^{-1}$ to 1520 $cm^{-1}$ is A, and
a reference line Lb connecting spectrum intensity at a wave number of 1650 $cm^{-1}$ and spectrum intensity at a wave number of 1800 $cm^{-1}$ on the relationship curve is drawn and a maximum size in the direction parallel to the spectrum intensity axis from Lb to the relationship curve in a wave number area of 1650 $cm^{-1}$ to 1800 $cm^{-1}$ is B,
A and B satisfy: $0.048 \leq B/A \leq 0.14$.

25. The multilayer electronic component of claim 24, wherein A and B further satisfy: $0.07 \leq B/A \leq 0.14$.

26. The multilayer electronic component of claim 24, wherein
when a reference line Lc connecting spectrum intensity at a wave number of 3100 $cm^{-1}$ and spectrum intensity at a wave number of 3700 $cm^{-1}$ on the relationship curve is drawn on the biaxial graph and a maximum size in the direction parallel to the spectrum intensity axis from Lc to the relationship curve in a wave number area of 3100 $cm^{-1}$ to 3700 $cm^{-1}$ is C,
A and C satisfy: $0.344 \leq 2*C/A \leq 0.367$.

27. The multilayer electronic component of claim 24, wherein the resin of the conductive resin layer includes a bisphenol A-based resin and a biphenyl-based resin, and
a ratio of a content of the biphenyl-based resin with respect to a total content of the bisphenol A-based resin and the biphenyl-based resin is 10 wt % or more and 50 wt % or less.

28. The multilayer electronic component of claim 27, wherein the ratio further satisfies 10 wt % or more and 40 wt % or less.

* * * * *